US012340940B2

(12) United States Patent
Hofer

(10) Patent No.: US 12,340,940 B2
(45) Date of Patent: Jun. 24, 2025

(54) DEVICE AND METHOD FOR WINDING TOROIDAL CORES WITHOUT USING A MAGAZINE

(71) Applicant: RUFF GMBH, Grafing bei München (DE)

(72) Inventor: Alois Hofer, Grafing bei München (DE)

(73) Assignee: RUFF GMBH, Grafing bei München (DE)

( * ) Notice: Subject to any disclaimer, the term of this patent is extended or adjusted under 35 U.S.C. 154(b) by 467 days.

(21) Appl. No.: 17/794,593

(22) PCT Filed: Jan. 20, 2021

(86) PCT No.: PCT/EP2021/051214
§ 371 (c)(1),
(2) Date: Jul. 21, 2022

(87) PCT Pub. No.: WO2021/148474
PCT Pub. Date: Jul. 29, 2021

(65) Prior Publication Data

US 2023/0066596 A1 Mar. 2, 2023

(30) Foreign Application Priority Data

Jan. 21, 2020 (EP) .................................... 20152958

(51) Int. Cl.
*H01F 7/06* (2006.01)
*H01F 41/08* (2006.01)

(52) U.S. Cl.
CPC .................................. *H01F 41/08* (2013.01)

(58) Field of Classification Search
CPC ....... H01F 41/08; H01F 41/082; H01F 41/094
See application file for complete search history.

(56) References Cited

U.S. PATENT DOCUMENTS

| | | | | |
|---|---|---|---|---|
| 4,884,758 A * | 12/1989 | Hamkins | H01F 41/08 242/437.1 |
| 10,199,164 B2 * | 2/2019 | Hofer | H01F 41/094 |
| 11,133,127 B2 * | 9/2021 | Zhou | H01F 41/082 |
| 2005/0247815 A1 * | 11/2005 | Sweeney | H02K 15/08 242/434 |

FOREIGN PATENT DOCUMENTS

| | | |
|---|---|---|
| DE | 10153896 A1 | 5/2003 |
| EP | 2953149 A1 | 12/2015 |

* cited by examiner

*Primary Examiner* — Paul D Kim
(74) *Attorney, Agent, or Firm* — David R. Stevens; Stevens Law Group

(57) ABSTRACT

The invention relates to a device and a method for winding toroidal cores One aspect includes a substantially circular needle roller which is arranged on a winding plane substantially parallel to the wire, is rotatably mounted, and can be positioned relative to the toroidal core retaining element such that the needle roller winds a wire section located on the winding plane through and about a toroidal core which is guided in the toroidal core retaining element during operation. A deflecting roller may be rotatably mounted on the needle roller in a first recess on the winding plane and may be designed to wind the wire section through and about the toroidal core during operation. A baffle plate arranged on the needle roller may be designed to guide the wire to be wound between the winding plane and a storing plane arranged substantially parallel to the winding plane.

13 Claims, 6 Drawing Sheets

DEVICE AND METHOD FOR WINDING TOROIDAL CORES WITHOUT USING A MAGAZINE

Figure 1:
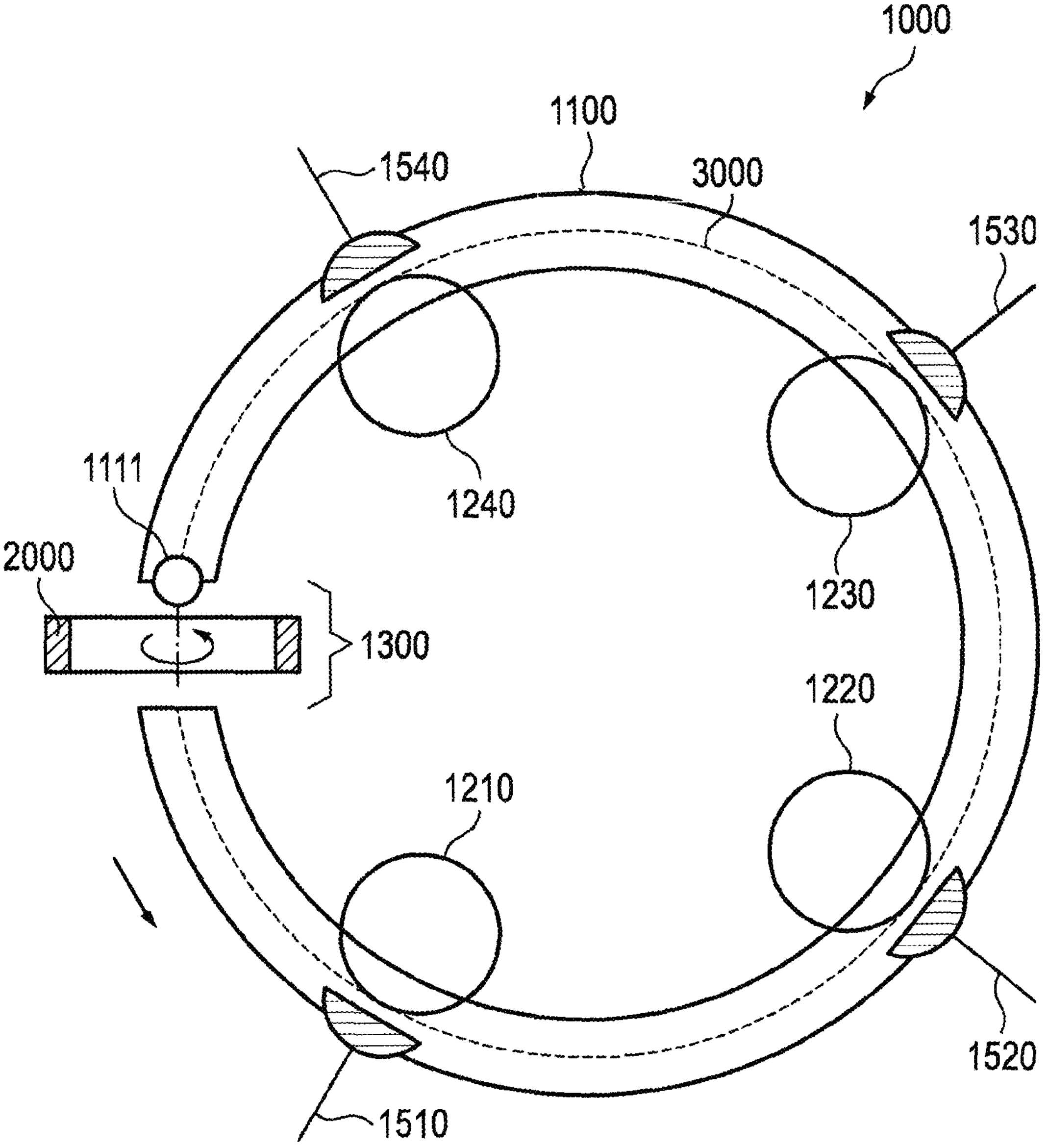

The invention relates to a device and a method for winding toroidal cores, which can be guided in a toroidal core retaining element, with a wire comprising multiple wire sections, without using a magazine.

A device for winding toroidal cores with an annular magazine guided through the toroidal core opening, with elements for the wire guidance and wire magazine arrangement is known, for example, from DE 101 53 896 A1. This known device has the disadvantage that the annular magazine for storing and winding must be guided through the toroidal core, and therefore toroidal cores with small diameters, through which the magazine cannot be guided due to the spatial requirements of the magazine, or when winding is being carried out with thicker wires, cannot be fully wound.

A further toroidal core winding device with a toroidal core retaining device and a wire guide without a magazine is known, for example, from EP 2 953 149 B1. A disadvantage with this known device is the fact that the winding quality may be reduced due to the wire not being monitored or controlled at times during operation, and the precision of the wire layers on the toroidal core without crossovers cannot always be guaranteed.

The object of the present invention is therefore to provide a device for winding toroidal cores without a magazine, and a corresponding winding method, which allows for an automated winding without a magazine of toroidal cores, in particular with comparatively small toroidal core diameters and of toroidal cores with very small diameters. In addition, the device is intended to be simple and robust in design, and economical to produce. Winding without a magazine is understood to mean that, unlike the prior art, there is no need for an annular magazine to be guided through the toroidal core opening.

To solve this object, the invention provides for a device with a toroidal core retaining element, for winding toroidal cores which can be guided in the toroidal core retaining element, with a wire comprising multiple wire sections, wherein the toroidal core retaining element which is driven to wind toroidal cores and the wire are preferably aligned perpendicular to one another. The device further comprises at least one essentially circular needle roller, arranged in a winding plane substantially parallel to the wire, which is rotatably mounted and can be positioned relative to the toroidal core retaining element in such a way that the needle roller winds through a wire section located in the winding plane and about a toroidal core which in operation is guided in the toroidal core retaining element. The needle roller further comprises a deflecting roller, which is rotatably mounted in a first recess in the winding plane at the needle roller, and is designed to wind the wire section located in the winding plane through and about the toroidal core during operation, and a baffle plate, which is arranged on the needle roller in a second recess in the winding plane, adjacent to the first recess, and is designed to guide the wire to be wound in operation via a guide groove between the winding plane and a storing plane arranged substantially parallel to the winding plane. The device further comprises multiple storing elements arranged in the storing plane, which are mounted in a stationary and rotatable manner, and which are designed to store wire sections located in the storing plane.

To solve the object, a method is also proposed for the winding of a toroidal core which can be guided in a toroidal core retaining element, without a magazine, with a wire comprising multiple wire sections. The method comprises the rotation of a needle roller, comprising a baffle plate and a deflecting roller, through the toroidal core, and also following steps: Guiding a wire section of the wire, stored on several storing elements and located in a storing plane, from storage elements arranged in the storing plane, via a guide groove of the baffle plate, onto the deflecting roller, which is arranged in a winding plane arranged substantially parallel to the storing plane; guiding of the wire section located in the winding plane about the deflecting roller and on to the toroidal core; winding the toroidal core with the wire section located in the winding plane; and guiding any wire section which has not been wound and is still present in the winding plane back again, via the deflecting roller through the guide groove and onto the various storing elements in the storing plane.

The storing takes place according to the invention by means of the storing elements arranged in the storing plane, in that the wire sections located in the storing plane are stored on the storing elements. Since a predetermined length of the wire from a wire store is simultaneously wound about the toroidal core and stored on the storing elements, the cycle time of the winding process is comparably reduced. Since due to the use of the storing elements which are not guided through the toroidal core during the storing and winding, and, associated with this, the doing away with a conventional magazine for storing the wire, at the end of the winding only a wire section present in the winding plane is guided through the toroidal core, such that even toroidal cores with very small residual hole diameters (inner diameter of the wound toroidal core with wound-up wire layers at the end of the winding) can be wound. Moreover, as a result of this, toroidal cores with small inner diameters or with thicker wires can be wound than is possible with conventional toroidal core winding machines.

In comparison with a conventional toroidal core (coil) winding device, with an annular magazine which is guided through the toroidal core opening, the device according to the invention is of simple design, since it is possible to do away with the annular magazine. Due to the relatively simple design, the device is likewise robust and economical. The method according to the invention therefore allows for an automated winding, without a magazine, even of toroidal cores with small inner diameters or toroidal cores with other core geometries, which cannot be wound with conventional toroidal core (coil) winding devices with magazines.

In comparison with conventional toroidal core winding devices with multiple wire sections stored in the winding plane, the invention is of simple design, since it is possible to do without transport rollers, a wire ejector, and a wire tautener. Due to the relatively simple design, the device is likewise robust and economical to manufacture. The method according to the invention therefore allows for automated winding, without a magazine, even of toroidal cores with small inner diameters or toroidal cores with other core geometries, which cannot be wound with conventional toroidal core winding devices with multiple wire sections stored in the winding plane.

According to one aspect of the invention, an interruption interrupts the essentially circular shape of the needle roller in one region, such that the toroidal core can be positioned in the circumference of the needle roller, or the needle roller can be positioned in a position for winding the toroidal core, in which the needle roller is arranged in such a way that it can be rotated through the toroidal core. After the ending of the winding, the needle roller can then leave this position, and the toroidal core can be removed from the toroidal core retaining element. This allows for simplified winding, a simple automation of the process, and a reduction in the process time for the winding of the toroidal core.

According to a further aspect of the invention, the needle roller comprises a toothed rim, which is arranged in a drive plane arranged substantially parallel to the winding plane, and is designed to drive the needle roller rotationally. The toothed rim comprises a tooth arrangement, by means of which it is driven by an external drive unit. The rotational movement of the toothed rim is transferred onto the needle roller, such that the toroidal core can be wound. This increases the mastery of the process and simplifies the handling of the device.

According to a further aspect of the invention, the needle roller is designed such that, in operation, it winds the wire section located in the winding plane simultaneously through and around the wire section present in the storing plane, and stores the wire section present in the storing plane on the multiple storing elements. At the beginning, the wire is introduced into the device from a wire store, up until a predetermined length of the wire has been introduced. The predetermined length of the wire from the wire store is simultaneously wound through and around the toroidal core, and stored on the storing elements located in the storing plane. When the predetermined length of the wire has been delivered from the wire store, the wire is separated from the wire store, such that no further wire is delivered from the store, and the wire sections located in the winding plane are wound through and around the toroidal core. As a result, a quantity of residual wire which cannot be wound onto the toroidal core is minimised, and simple automation of the process is made possible.

According to a further aspect of the invention, the needle roller is designed such as to wind the wire located in the winding plane centrally through and about the toroidal core. As a result, the quality of the wound toroidal cores can be improved, in as much as the wire windings are wound up by means of the winding process in each case perpendicular to the toroidal cores with a substantially circular geometry. In addition to this, this aspect provides for more space inside the toroidal core during the winding. This also allows for a relative lateral movement between the toroidal core and the needle roller, in order, for example, for toroidal cores with non-circular geometry to be moved into a central position in relation to the needle roller.

According to a further aspect of the invention, the device further comprises at least one wire brake, wherein the at least one wire brake is designed to brake at intervals the wire section present in the storing plane, by pressing on at least one of the multiplicity of storing elements, and to tauten the wire in operation. As a result, the tensile loading on the wire can be regulated, and the loading on the wire can be kept constant, and therefore the risk of a tear or excessively slack winding of the wire onto the toroidal core can be reduced.

According to a further aspect of the invention, the multiplicity of storage elements are designed as rollers, which are driven such as to rotate at intervals in a reciprocal effect with the at least one wire brake. In one preferred embodiment, the storing elements are mounted on one side facing away from the needle roller, and are closed off by surrounding regions. Furthermore, in one preferred embodiment, on a side of the storing elements facing towards the needle roller, means are provided to avoid undesirable falling of the wire sections present in the storing plane from the storing elements during the winding process. These means are preferably a circumferential chamfered edge. In one region of the circumferential path of the needle roller, which has passed the deflecting roller with the wire section present in the winding plane within one revolution, the wire section present in the storing plane is driven by the rollers in the direction of rotation of the needle roller, and is not braked by the at least one wire brake. In one region of the circumferential path of the needle roller, which has not yet passed the deflecting roller with the wire section present in the winding plane within one rotation, the wire section present in the storing plane is not driven by the rollers in the direction of rotation of the needle roller, and braked by the at least one wire brake. As a result, the loading on the wire can be held constant, and the risk of a tear is reduced. Moreover, this also prevents the wire from moving loosely in the system during the winding, as a result of which the quality of the winding can be increased.

Exemplary embodiments of the invention are explained in greater detail hereinafter, on the basis of the attached Figures. These show:

FIG. 1. A rudimentary schematic side view of an embodiment of the device for the winding of toroidal cores without a magazine, in which, for the sake of simplification, among other elements, the toroidal core retaining element and the wire store are not shown.

Figure 2:
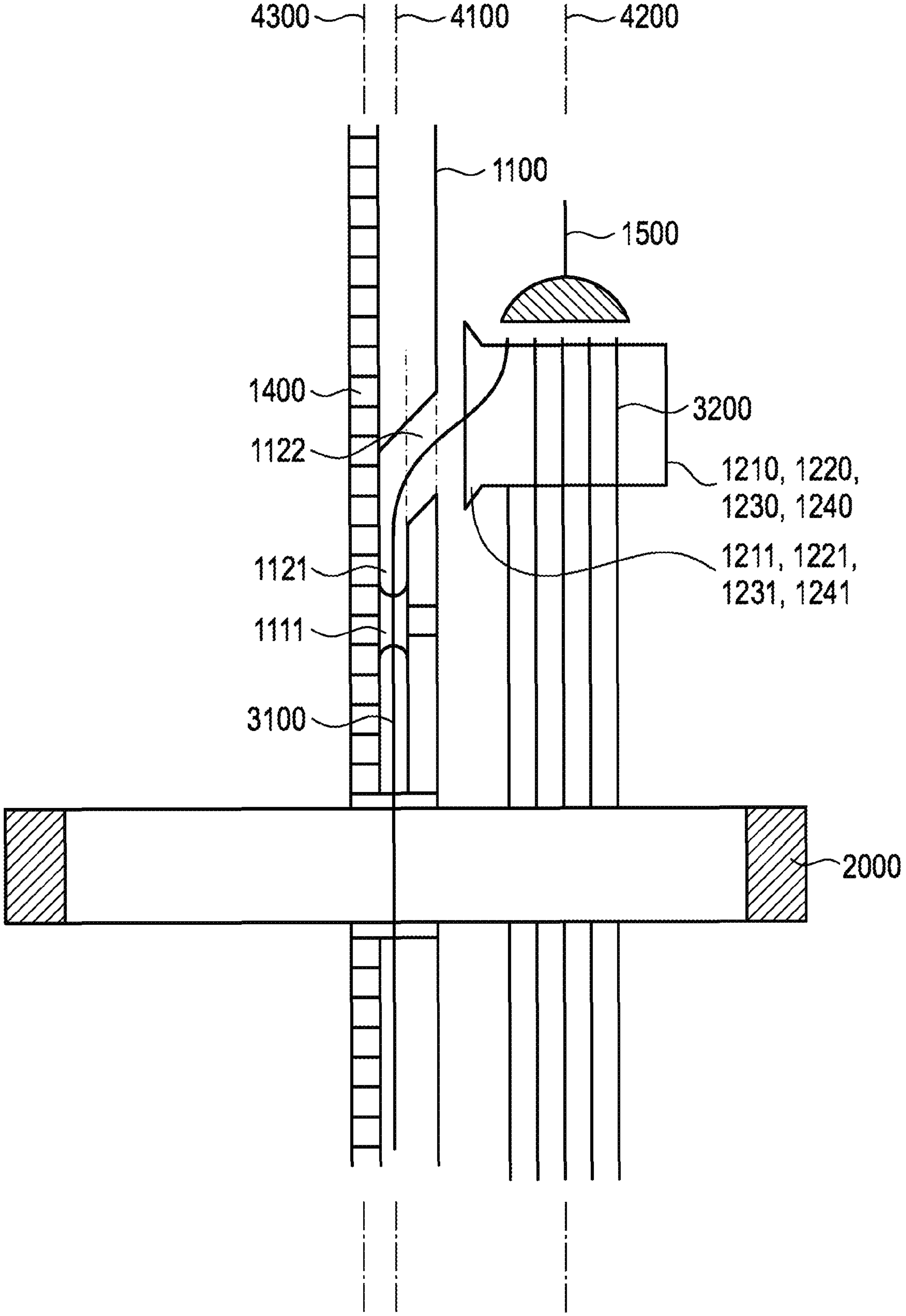

FIG. 2. A rudimentary schematic front view of a section of an embodiment of the device for the winding of toroidal cores without a magazine, in which, for the sake of simplification, among other elements, the toroidal core retaining element and the wire store are not shown.

Figure 3:
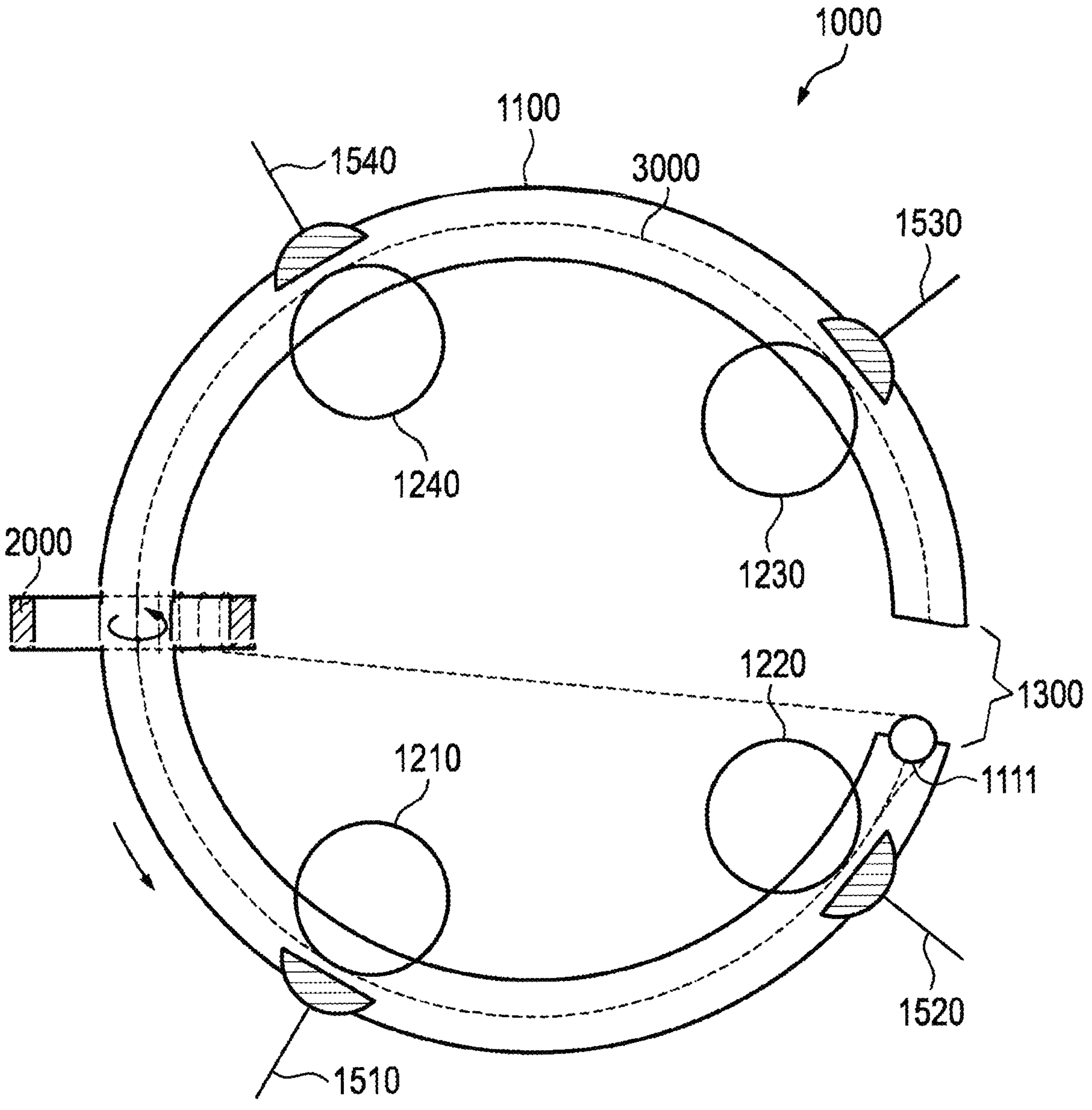

FIG. 3. A rudimentary schematic side view of a section of an embodiment of the device for the winding of toroidal cores without a magazine, in which, for the sake of simplification, among other elements, the toroidal core retaining element and the wire store are not shown.

Figure 4:
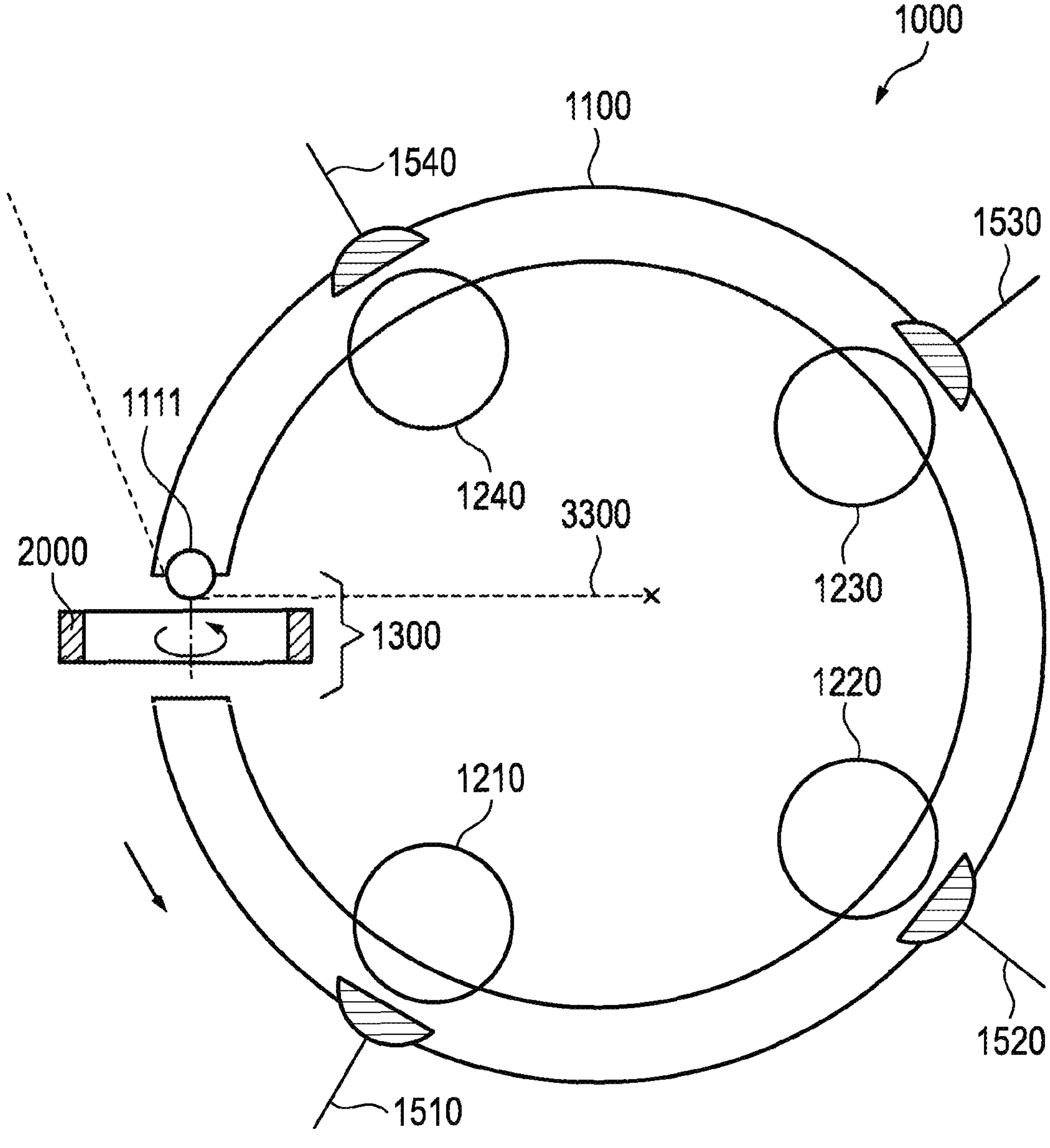

FIG. 4. A rudimentary schematic side view of a section of an embodiment of the device for the winding of toroidal cores without a magazine, in which, for the sake of simplification, among other elements, the toroidal core retaining element and the wire store are not shown.

Figure 5:
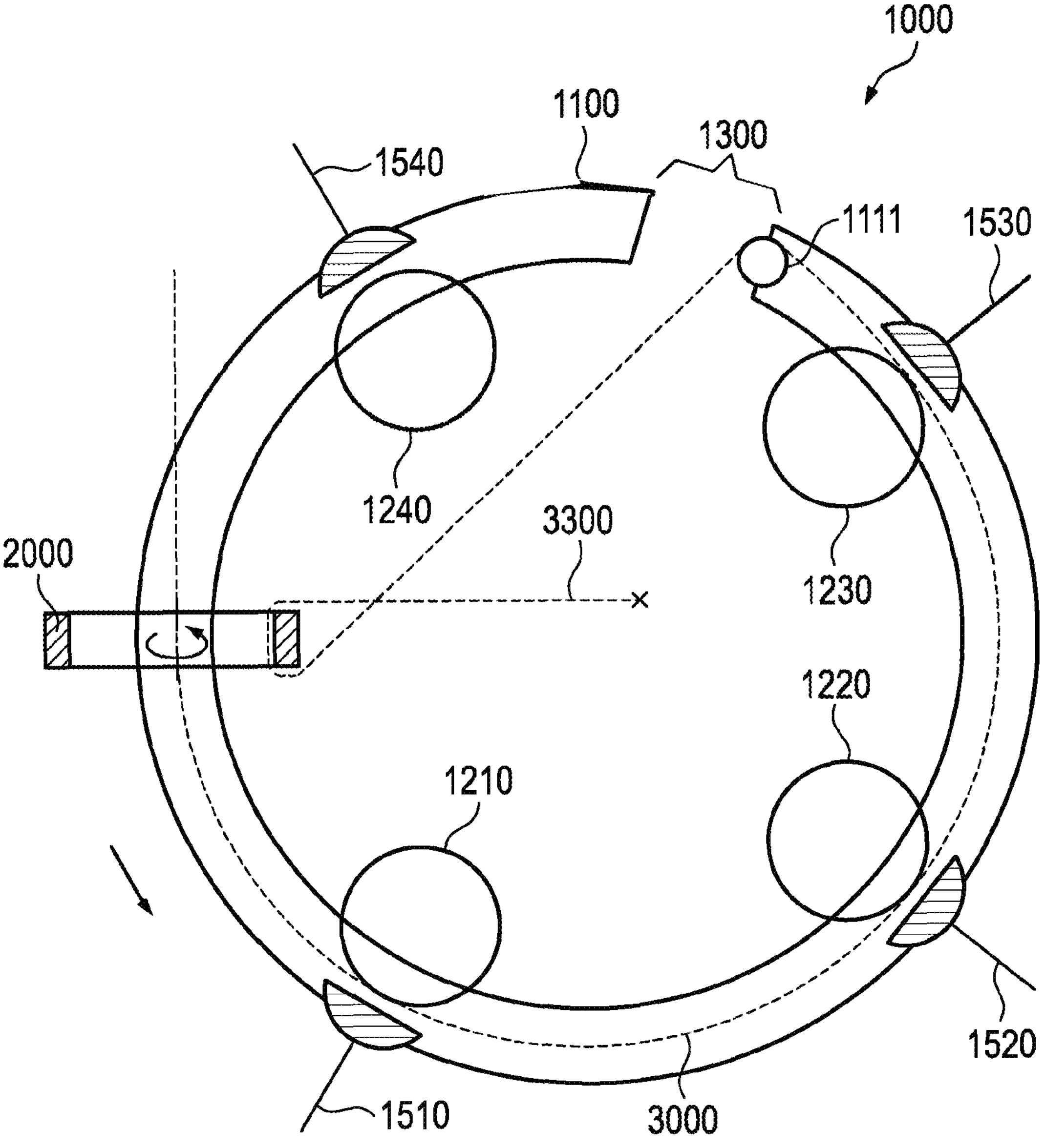

FIG. 5. A rudimentary schematic side view of a section of an embodiment of the device for the winding of toroidal cores without a magazine, in which, for the sake of simplification, among other elements, the toroidal core retaining element and the wire store are not shown.

Figure 6:
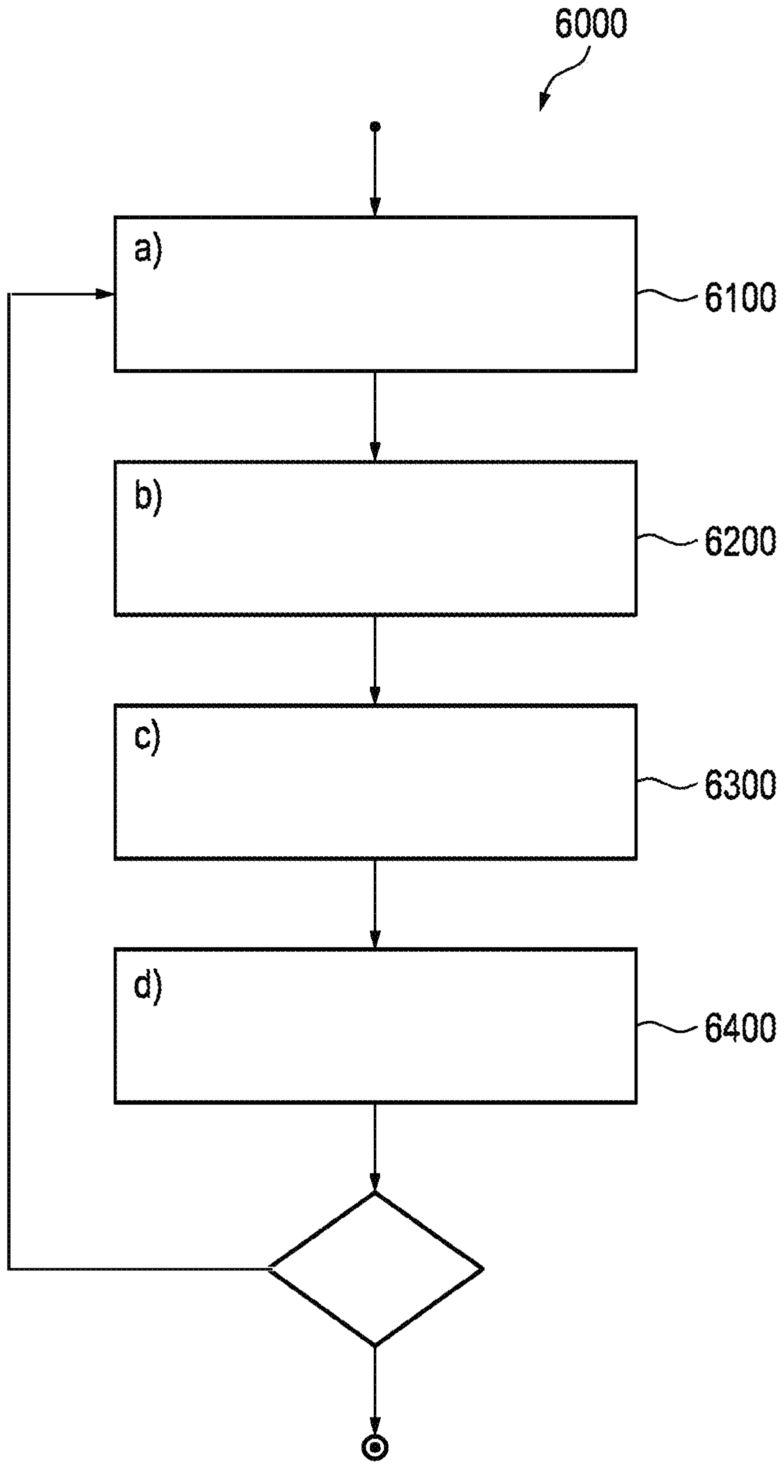

FIG. 6. A flow diagram of a method for the winding of toroidal cores without a magazine, in accordance with one embodiment of the present invention.

The device 1000 for the winding toroidal cores 2000 without using a magazine in accordance with FIGS. 1 to 3 comprises preferably a toroidal core retaining element (not represented), in which the toroidal cores 2000 are held which are to be wound, and which is rotated during the winding. According to an embodiment, the toroidal core retaining element is formed by three pressure rollers (not represented), which are preferably arranged in each case at an angle of 120° to one another about the toroidal core 2000 and press against the toroidal core 2000 from the outside, and therefore hold it in the desired position. At least one of the pressure rollers simultaneously drives the toroidal core 2000, and therefore sets it into the desired rotation in order to wind the windings at a desired distance interval about the toroidal core 2000.

Instead of a magazine, the device 1000 comprises, for the winding of toroidal cores 2000 without a magazine, a multiplicity of storing elements 1210, 1220, 1230, 1240 arranged in the magazine plane 4200, which are mounted in a stationary and rotational manner, and are designed to store wire sections 3200 located on the storing plane 4200. The axis of rotation of the toroidal core 2000 lies preferably substantially in the winding plane 4100, and the axes of rotation of the toroidal core 2000 and of the storing elements 1210, 1220, 1230, 1240 are preferably arranged substantially perpendicular to one another.

According to the embodiment represented in FIGS. 1 to 3, the storing elements 1210, 1220, 1230, 1240 are arranged distributed uniformly along the circumferential path of the needle roller 1100. The wire section 3200 located in the storing plane 4200 is stored on the storing elements 1210, 1220, 1230, 1240, and is drawn from them as required during winding. The number of the storing elements 1210, 1220, 1230, 1240 is not limited in this situation, but embodiments with at least four storing elements 1210, 1220, 1230, 1240 are preferred.

For the further winding, the toroidal core 2000 is wound by the needle roller 1100 with the deflecting roller 1111 using the wire section 3100 located in the winding plane 4100. Due to the rotation of the needle roller 1100 and the deflecting roller 1111, the wire section 3200, located in the storing plane 4200, of the wire 3000 stored on the multiplicity of storing elements 1210, 1220, 1230, 1240 is guided from the storing elements 1210, 1220, 1230, 1240 via the guide slot 1121 of the baffle plate 1122 onto the deflecting roller 1111. The wire section 3100 located in the winding plane 4100 is then guided about the deflecting roller 1111 to the toroidal core 2000 and wound about the toroidal core 2000. After the winding of the toroidal core 2000 with the wire section 3100 located in the winding plane 4100, the wire section 3100 which is located in the winding plane 4100 and has not been wound is then guided back again via the deflecting roller 1111 through the guide groove 1121 and onto the multiplicity of storing elements 1210, 1220, 1230, 1240 in the storing plane 4200. With the progressing winding of the wire 3000 onto the toroidal core 2000, the quantity of wire 3000 is reduced, i.e. the wire sections 3100 located in the winding plane 4100 and the wire sections 3200 located in the storing plane 4200 which are guided through the toroidal core 2000. As a result, in particular, toroidal cores 2000 can also be wound of which the residual hole diameters (inner diameters of the wound toroidal core 2000 with wire layers wound on it as the winding progresses) become small in the course of the winding.

The wire section 3200 located in the storing plane 4200 which had not yet been wound is braked at intervals by the at least one wire brake 1510, 1520, 1530, 1540, by pressing against at least one of the multiplicity of storing elements 1210, 1220, 1230, 1240, and is therefore held taut when in operation. According to one embodiment, the multiplicity of storing elements 1210, 1220, 1230, 1240 are designed as rollers, which are rotationally driven at intervals in reciprocal effect with the at least one wire brake 1510, 1520, 1530, 1540. In one preferred embodiment, the storing elements 1210, 1220, 1230, 1240 are stored on a side facing away from the needle roller 1100, and are enclosed by surrounding regions. Moreover, in one preferred embodiment, means are provided on a side of the storing elements 1210, 1220, 1230, 1240, facing towards the needle roller 1100, for avoiding an undesirable falling of the wire sections 3200 present in the storing plane 4200 from the storing elements 1210, 1220, 1230, 1240 during the winding process. These means are preferably a circumferential chamfered edge 1211, 1221, 1231, 1241 as represented in FIG. 2. As shown in FIG. 3, in one region of the of the circumferential path of the needle roller 1100, which has passed the deflecting roller 1111 with the wire section 3100 present in the winding plane 4100 within one revolution, the wire section 3200 present in the storing plane 4200 is driven by the rollers in the direction of rotation of the needle roller 1100, and is not braked by the at least one wire brake 1510, 1520, 1530, 1540. In one region of the circumferential path of the needle roller 1100, which has not yet passed the deflecting roller 1111 with the wire section 3100 present in the winding plane 4100 within one rotation, the wire section 3200 present in the storing plane 4200 is not driven by the rollers in the direction of rotation of the needle roller 1100, and braked by the at least one wire brake 1510, 1520, 1530, 1540. As a result, the loading on the wire 3000 can be held constant, and the risk of a tear is reduced. Moreover, this also prevents the wire 3000 from moving loosely in the system during the winding, as a result of which the quality of the winding can be increased.

According to one embodiment, the method 6000 for the winding of toroidal cores 2000 without using a magazine can be described as follows, by making reference to FIGS. 4 to 6. The toroidal core 2000 is held in the toroidal core retaining element and rotated during the winding. Next, a wire end 3300 is guided out of the wire store, about the deflecting roller 1111, and past the toroidal core 2000, as represented in FIGS. 4 and 5. The wire end 3300 guided past the toroidal core 2000 is fixed (represented as a cross), and the needle roller 1100 winds a first winding about the toroidal core 2000. The first windings now fix the wire 3000 during the further winding, and the needle roller 1100 can wind further windings without an external fixing. Following this, a predetermined length of the wire 3000 is brought from the wire store into the device 1000. The predetermined length of the wire 3000 from the wire store is therefore, as represented in FIG. 5, wound simultaneously through and about the toroidal core 2000 and stored onto the storing elements 1210, 1220, 1230, 1240. The wire 3000 is brought entirely into the device 1000 when the predetermined length of the wire 3000 is stored on the storing elements 1210, 1220, 1230, 1240 located in the storing plane 4200. When the predetermined length of the wire 3000 has been guided out of the wire store and is stored on the storing elements 1210, 1220, 1230, 1240, the wire 3000 is separated from the wire store, and therefore no further wire 3000 is guided from the wire store, and the wire section 3100 located in the winding plane 4100 is further wound through and about the toroidal core 2000, as represented in FIG. 3. As a result, any quantity of residual wire which cannot be wound onto the toroidal core 2000 is minimised, and an automated winding of toroidal cores 2000 without a magazine is therefore possible.

FIG. 6 shows a flow diagram 6000 of a method for the winding of toroidal cores without using a magazine, according to one embodiment of the present invention. According to step 6100, during the winding process the wire section 3200, located in the storing plane 4200, of the wire stored on the multiplicity of storing elements 1210, 1220, 1230, 1240 is guided from the storing elements 1210, 1220, 1230, 1240, via the guide groove 1121 of the baffle plate 1122 and onto the deflecting roller 1111. The deflecting roller 1111 is in this situation preferably arranged in the winding plane 4100, arranged substantially parallel to the storing plane 4200. According to a further step 6200, the wire section 3100 located in the winding plane 4100 is guided about the deflecting roller 1111 to the toroidal core 2000. According to a third step 6300, the toroidal core 2000 is wound with the wire section 3100 located in the winding plane 4100. In this situation, the toroidal core 2000 is held by the toroidal core retaining element, and is rotated during the winding process.

According to a further step 6400, a wire section 3100, which has not been wound and is located in the winding plane 4100, is then guided back again via the deflecting roller 1111 through the guide groove 1121 and onto the multiplicity of storing elements 1210, 1220, 1230, 1240 in the storing plane 4200.

In the meaning of the invention, the term toroidal core also includes tubular cores or cores with special opening geometries, and relates in particular to such toroidal cores with small inner diameters or cores with angled opening geometries, as well as tubular cores which, due to their dimensions cannot be wound with conventional toroidal core winding devices, since the magazine cannot be guided through the toroidal core opening due to the space required for the magazine. The embodiments described here are, however, likewise well-suited for the winding of other toroidal cores or cores with other openings, and also such with larger inner diameters, and allow for simple and convenient winding.

In the meaning of the invention, the term wire also includes all other materials with which, in a rational manner, toroidal cores or similar objects are to be wound in accordance with the invention.

Further advantageous embodiments and derivations derive for the person skilled in the art from the exemplary embodiments described here, and will be understood by him as belonging to the invention.

The invention claimed is:

1. A device with a toroidal core retaining element for winding a wire on toroidal cores, which can be guided in the toroidal core retaining element, the wire comprising a multiplicity of wire sections, and further comprising:

- a substantially circular needle roller, arranged substantially parallel to the wire and mounted so as to be rotatably movable and which can be positioned relative to the toroidal core retaining element in such a way that the needle roller winds a wire section located in a winding plane through and about a toroidal core guided in the toroidal core retaining element when in operation, wherein the needle roller further comprises:
  - a deflecting roller, which is rotationally mounted in a first recess in the winding plane at the needle roller, and is designed so as to wind the wire section located in the winding plane through and about the toroidal core when in operation; and
  - a baffle plate, which is arranged in a second recess in the winding plane, adjacent to the first recess at the needle roller, and which is designed to guide the wire which is to be wound, during operation, via a guide groove between the winding plane and a storing plane arranged substantially parallel to the winding plane, and the device further comprises:

- a multiplicity of storing elements arranged in the storing plane, which are mounted in a stationary and rotatable manner, and are designed to store one or more wire sections located in the storing plane.

2. The device for winding toroidal cores according to claim 1, wherein an interruption interrupts a substantially circular form of the needle roller in one region, such that the needle roller can be positioned in a position provided for the winding of the toroidal core, and wherein the needle roller is arranged in such a way that the needle roller can be rotated through the toroidal core.

3. The device for winding toroidal cores according to claim 1, wherein the needle roller comprises a toothed rim, which is arranged in a drive plane arranged substantially parallel to the winding plane, and is designed to drive the needle roller rotationally.

4. The device for winding toroidal cores according to claim 1, wherein the needle roller is designed so as to wind a wire section located in the winding plane, when in operation, simultaneously through and about the toroidal core which is being guided in the toroidal core retaining element and to store a wire section located in the storing plane onto the multiplicity of storing elements.

5. The device for winding toroidal cores according to claim 1, wherein the deflecting roller is designed so as to wind the wire section located in the winding plane centrally through and about the toroidal core.

6. The device for winding toroidal cores according to claim 1, further comprising at least one wire brake, wherein the at least one wire brake is designed so as to brake a wire section located in the storing plane by pressing at intervals on at least one of the multiplicity of storing elements, and to keep the wire taut when in operation.

7. The device for winding toroidal cores according to claim 6, wherein the multiplicity of storing elements are rollers, which are driven in rotation at intervals in reciprocal effect with the at least one wire brake.

8. A method for winding a wire on a toroidal core, which can be guided in a toroidal core retaining element, with a wire comprising a multiplicity of wire section, wherein the method comprises a rotation of a needle roller, comprising a baffle plate and a deflecting roller, through the toroidal core, and comprises the following steps:

a. Guiding a wire section, located in a storing plane, of the wire stored on a multiplicity of storing elements from storing elements arranged in the storing plane, via a guide groove of the baffle plate, and onto the deflecting roller, which is arranged in a winding plane arranged substantially parallel to the storing plane, b. Guiding the wire section located in the winding plane about the deflecting roller as far as the toroidal core;

C. Winding the toroidal core with the wire section located in the winding plane; and d. Guiding back a wire section located in the winding plane which has not been wound, via the deflecting roller, through the guide groove, and onto the multiplicity of storage elements in the storing plane.

9. The method for winding toroidal cores according to claim 8, wherein the toroidal core guided in the toroidal core retaining element rotates when in operation perpendicular to the rotation of the needle roller.

10. The method for winding toroidal cores according to claim 8, wherein the wire on the storing elements is tautened at intervals by at least one wire brake.

11. The method for winding toroidal cores according to claim 8, wherein the method is carried out by making use of the device for winding of toroidal cores according to claim 1.

12. The method for winding toroidal cores according to claim 8, wherein, at the beginning of the method, the wire section located in the winding plane is wound simultaneously through and about the toroidal core, and a quantity of wire required is stored on the multiplicity of storing elements in the storing plane.

13. The method for winding toroidal cores according to claim 8, wherein the steps a to d are run through repeatedly, in order to wind a desired number of windings of the wire onto the toroidal core.

* * * * *